Feb. 3, 1953 A. W. GAUBATZ 2,627,188
CRANK ARM ADJUSTABLE IN LENGTH AND ANGULAR POSITION
Filed Sept. 21, 1950
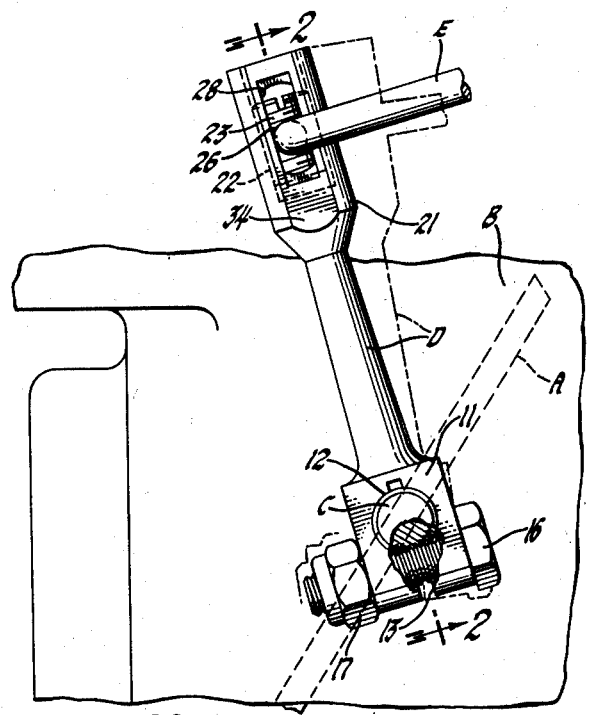
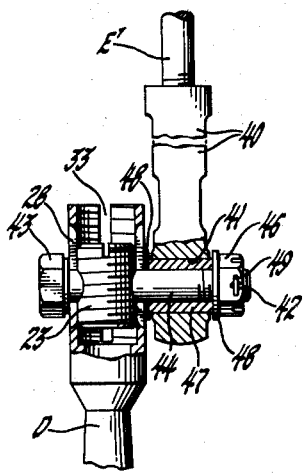
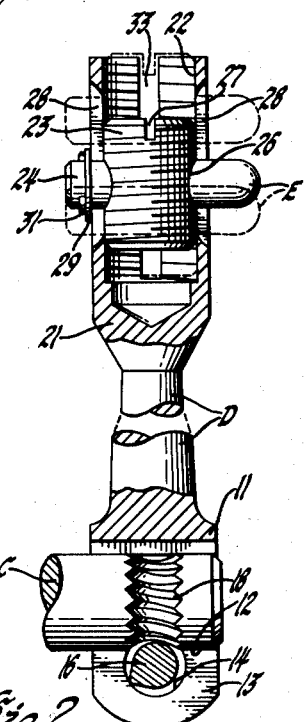
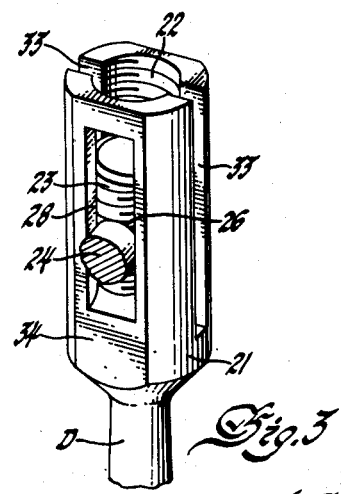
Inventor
Arthur W. Gaubatz
By Willis, Helmig & Baillio
Attorneys Patented Feb. 3, 1953

2,627,188

UNITED STATES PATENT OFFICE 2,627,188

CRANK ARM ADJUSTABLE IN LENGTH AND ANGULAR POSITION

Arthur W. Gaubatz, Indianapolis, Ind., assignor to General Motors Corporation, Detroit, Mich., a corporation of Delaware Application September 21, 1950, Serial No. 186,095

14 Claims. (Cl. 74—522)

My invention relates to mechanisms for transmitting motion, and more particularly to adjustable mechanisms of this character. More specifically, the invention is embodied in mechanisms by which a conversion between reciprocating and rotating motion may be effected, and in which both the relative extent of motion of the reciprocating and rotating members and the relative initial positions or datum conditions of the members may be adjusted.

The invention is capable of use in various mechanisms. One contemplated application is to control mechanisms for engines in which a throttle or other operated member is actuated by a pilot's control. In such mechanisms it is highly desirable to be able to adjust the movement of the throttle or the like with respect to the arc of travel of the pilot's control lever so that the desired total length of movement of the actuated device is obtained when the pilot's control lever is moved through its range, and to adjust the datum point of the actuated device. For example, a pilot's control lever may have "idle" and "full power" positions and may be connected to an engine throttle by a mechanical linkage. The throttle should be wide open when the lever is at "full power" position and should be in a position giving the desired engine operating characteristics when the control lever is in "idle" position. In an arrangement of this sort, adjustment is desirable both to accommodate manufacturing tolerances and to allow for variations in the characteristics of the engine during use.

Obviously, similar requirements may arise in other mechanisms than this one chosen as an example. The apparatus in which the invention is embodied is equally capable of converting reciprocating to rotating motion or the reverse. It may also be employed in whole or in part, in other motion-transmitting systems where adjustment is desirable.

While I am aware that such adjustments have been hitherto proposed, the structure in which the invention is preferably embodied is of novel character and highly advantageous from the standpoint of ease and flexibility of adjustment, simplicity and reliability of structure, and economy.

The principal objects of the invention are to provide an improved adjustable mechanism for conversion between rotating and reciprocating motion and to provide an improved longitudinally adjustable connection.

The advantages of the invention and the manner in which the stated objects and these advantages are realized will be apparent to those skilled in the art from the appended description of the preferred embodiments of the invention and the accompanying drawings, in which Figure 1 is a view of a mechanism in accordance with the invention, Figure 2 is a sectional view taken on the plane indicated in Figure 1, Figure 3 is an axonometric view of a portion of the crank arm, and Figure 4 is a partial view of a second form of the invention.

In Figure 1, the invention is illustrated by way of example as applied to the operation of a conventional butterfly throttle valve A in a fluid conduit B. The valve A is actuated by a shaft C on which is mounted an arm D rotated by a link or pull rod E. As is apparent, reciprocation of the rod E by any suitable mechanism will rotate the arm D, shaft C, and valve member A. The shaft end 11 of the arm D is preferably enlarged and is provided with a transverse bore 12 for the shaft C. The end of the arm is slotted, as indicated at 13, and is drilled at 14 at right angles to the shaft to receive a machine screw 16 fitted with a nut 17. By tightening the nut 17 the arm D is clamped tightly to the shaft.

Threads 18 are cut circumferentially of the shaft to provide a worm gear with which the threads of the screw 16 coact. The bore 12 of the lever engages the shaft C on both sides of the thread 18 when clamped.

By loosening the nut 17 and turning the screw 16, the angular relation of the arm D to the shaft C may be varied continuously through 360 degrees. When the desired angular relation is established, tightening the nut 17 clamps the arm to the shaft which is thus held in proper angular relation both by the engagement of the screw and worm thread and by the clamping action.

I am aware that angular adjustment of an arm with respect to its shaft by means of the sort described above has been previously disclosed, as in U. S. Patent 1,663,290. However, this mechanism constitutes but one element of the invention, in its more inclusive aspect.

The pivot point of the link E on the arm D may be adjusted longitudinally of the arm to vary the angular travel of the shaft C for a given movement of the link E. The outer end of the arm D may be enlarged to provide a head 21 which is drilled and tapped inwardly from the outer end thereof to form a threaded radially-disposed opening 22. The pivot or connection for the link E is provided by a threaded stud or plug 23 received in the bore 22 and crossbored for a pin 24, which, in Figures 1 and 2, is constituted by the end portion of the link E bent at right angles to pass through the bore 26 in the plug. The plug is preferably provided with a screwdriver slot 27 so that it may be readily rotated for adjustment when the pin 24 is removed. Slots 28 are milled through the head to provide clearance for the pin 24 throughout the normal range of adjustment of the plug 23. The pin 24 may be retained in any convenient manner, as by a washer 29 and a cotter pin 31.

If it is desired to change the effective length of the arm D, the pin 24 is removed and the plug 23 is rotated any integral multiple of 180 degrees in the appropriate direction, to realign the crossbore 26 with the slots 28. The effective lever arm may thus be varied in small increments equal to one-half the pitch of the threads on the plug. When the pin 24 is reinserted, it locks the plug against rotation so that the adjustment is automatically maintained. Preferably, the diameter of the pin is only slightly less than the width of the slots 28.

The head 21 is preferably bifurcated by being slotted through in a plane at right angles to the shaft, as indicated at 33. The head may thus be distorted slightly before or after threading to eliminate any looseness of the threads which might cause a slight lost motion in the mechanism. A relatively tight fit between the threads on plug 23 and bore 22 is also desirable to maintain the position of the plug if the pin 24 is removed. The provision of slots 33 is of greater consequence with the crank pin arrangement of Figure 4, as will be explained.

In the embodiment illustrated, ordinarily, if the range of travel of the throttle valve A is too great or too small, the length of the lever arm D is adjusted to correct this condition and then the angular position of the arm with respect to the shaft is adjusted to correct the datum position of the throttle valve.

As will be apparent to those skilled in the art, the mechanism is equally suitable for installations in which the shaft is the driving member and the reciprocating member is driven. It can be applied in multiple installations for equalizing movement transmitted from a single operator to plurality of driven devices, or to provide desired variations in such movement.

Figure 4 illustrates the use of the crank arm D with a more elaborate and more rigid crankpin arrangement. Since the arm D may be identical with the form previously described, only the outer end is shown.

The link E', corresponding to link E of Figure 1, is threaded into an eye fitting 40 formed with a transverse bore 41 forming a bearing for a crankpin 42. Arm D and link E' are rotated into the same plane in Figure 4 for clarity of illustration.

The crankpin may be similar to a machine bolt, with a head 43, and a body 44 threaded for a nut 46. A sleeve 47 fitting closely on the pin 42 between washers 48 may constitute the journal for bearing 41. The length of the sleeve is slightly greater than the width of the eye fitting to permit free relative rotation.

When the plug 23 has been adjusted to the desired point, pin 42 is passed through slots 28 and plug 23, and a washer 48, sleeve 47, fitting 40, the second washer 48, and nut 46 are assembled onto the pin. Upon tightening the nut 46, the upper end of the arm is clamped tightly against the plug 23 by virtue of the slots 33, and crankpin 42 is also held in rigid relation to the arm D. Nut 46 may be castellated to receive a cotter key 49.

The head 21 of arm D is formed with flat surfaces 34 around the slots 28 which act to prevent any rotation of pin 42 about the axis of the arm when the nut 46 is tightened.

It will be apparent that the form of Figure 4, while more elaborate, is superior in rigidity and freedom from slight lost motion than the form of Figure 1.

It will be apparent that subcombinations of the invention are of utility. The pin 24 or 42 may be connected to other devices than the links E and E' illustrated, and the longitudinal adjustment feature may be utilized in various mechanisms other than that chosen by way of example.

Many modifications of the invention within the scope thereof will occur to those skilled in the art. The invention is not to be considered as limited by the description of the preferred embodiments thereof.

I claim:

1. An adjustable motion-transmitting device comprising, in combination, a rotatable shaft, an arm extending from the shaft, a member in threaded engagement with the arm so as to be movable radially with respect to the shaft by rotation of the member, the member being formed with a transverse opening and the arm being formed with a longitudinally-disposed slot with which the said opening may be aligned throughout a range of travel of the member, and a pin inserted in the said opening and passing through the said slot.

2. An adjustable motion-transmitting device comprising, in combination, a rotatable shaft, an arm extending from the shaft, a link pivoted on the arm remote from the shaft, and means for adjusting the displacement of the link pivot from the axis of the shaft comprising a member in threaded engagement with the arm so as to be movable radially with respect to the axis by rotation of the member, the member being formed with a transverse opening and the arm being formed with a longitudinally-disposed slot with which the said opening may be aligned throughout a range of travel of the member, and a pin inserted in the said opening and passing through the said slot, the pin constituting a motion-transmitting pivotal connection beween the arm and link.

3. An adjustable motion-transmitting device comprising, in combination, a rotatable shaft, an arm extending from the shaft, means for adjusting the arm angularly with respect to the shaft, a motion-transmitting means on the arm remote from the shaft, and means for adjusting the displacement of the said motion-transmitting means from the axis of the shaft comprising a member in threaded engagement with the arm so as to be movable radially with respect to the axis by rotation of the member, the member being formed with a transverse opening and the arm being formed with a longitudinally-disposed slot with which the said opening may be aligned throughout a range of travel of the member, the said motion-transmitting means being fitted in the said opening nad passing through the said slot.

4. An adjustable motion-transmitting device comprising, in combination, a rotatable shaft, an arm extending from the shaft, a link pivoted on the arm remote from the shaft, and means for adjusting the displacement of the link pivot from the axis of the shaft comprising a member in threaded engagement with the arm so as to be movable radially with respect to the axis by rotation of the member, the member being formed with a transverse opening and the arm being formed with a longitudinally-disposed slot with which the said opening may be aligned throughout a range of travel of the member, and a pin journalled in the said opening and passing through the said slot, the pin constituting a motion-transmitting pivotal connection beween the arm and link, and the pin engaging the walls of the slot to prevent rotation of the member.

5. An adjustable motion-transmitting device comprising, in combination, a rotatable shaft, an arm extending from the shaft, means for adjusting the arm angularly in infinitesimal increments with respect to the shaft and securing the arm in the adjusted position, a link pivoted on the arm remote from the shaft, and means for adjusting the displacement of the link pivot from the axis of the shaft comprising a member in threaded engagement with the arm so as to be movable radially with respect to the axis by rotation of the member, the member being formed with a transverse opening and the arm being formed with a longitudinally-disposed slot with which the said opening may be aligned throughout a range of travel of the member, and a pin journalled in the said opening and passing through the said slot, the pin constituting a motion-transmitting pivotal connection between the arm and link.

6. An adjustable motion-transmitting device comprising, in combination, a movable body formed with a threaded bore therein, a threaded plug rotatable in the bore and formed with a transverse opening, the body being formed with slots opening into the bore with which the said opening is registrable through a range of movement of the plug, a pin insertable through the said opening and slots, and a member journaled on the pin.

7. An adjustable motion-transmitting device comprising, in combination, a first body formed with a threaded portion, a second threaded body cooperating with the threaded portion for adjustment axially of the threads and formed with a transverse opening, the first body being formed with a transverse passage through the threaded portion with which the said opening is registrable through a range of relative movement of the bodies, a pin insertable through the said opening and passage, a member journaled on the pin, the outer one of the said bodies being bifurcated by kerfs in a plane substantially normal to the axis of the pin when it is inserted through the slots, and means on the pin for compressing the furcations of the said outer body against the plug.

8. An adjustable motion-transmitting device comprising, in combination, a movable body formed with a threaded bore therein, a threaded plug rotatable in the bore and formed with a transverse opening, the body being formed with slots opening into the bore with which the said opening is registrable through a range of movement of the plug, a pin insertable through the said opening and slots, a member journaled on the pin, the body being bifurcated by kerfs in a plane substantially normal to the axis of the pin when it is inserted through the slots, and means on the pin for compressing the furcations of the body against the plug.

9. An adjustable motion-transmitting device comprising, in combination, a movable body formed with a threaded bore therein, a threaded plug rotatable in the bore and formed with a transverse opening, the body being formed with slots opening into the bore with which the said opening is registrable through a range of movement of the plug, a pin insertable through the said opening and slots, a member journaled on the pin, the body being bifurcated by kerfs in a plane substantially normal to the axis of the pin when it is inserted through the slots, and means on the pin for compressing the furcations of the body against the plug, the body being formed with parallel flat surfaces about the slots.

10. An adjustable motion-transmitting device comprising, in combination, a shaft, a movable body formed with a threaded bore therein and mounted on the shaft for angular adjustment relative to the shaft, a threaded plug rotatable in the bore and formed with a transverse opening, the body being formed with slots opening into the bore with which the said opening is registrable through a range of movement of the plug, a pin insertable through the said opening and slots, a member journaled on the pin, the body being bifurcated by kerfs in a plane substantially normal to the axis of the pin when it is inserted through the slots, and means on the pin for compressing the furcations of the body against the plug.

11. An adjustable motion-transmitting device comprising, in combination, a body rotatable about an axis, a member in threaded engagement with the body so as to be movable radially toward and from the said axis by rotation of the member, the member being formed with a transverse opening and the body being formed with a slot with which the said opening may be aligned throughout a range of travel of the member, and a motion-transmitting means fitting in the said opening and passing through the said slot.

12. An adjustable motion-transmitting device comprising, in combination, a movable body formed with a threaded bore therein, a threaded plug rotatable in the bore and formed with a transverse opening, the body being formed with slots opening into the bore with which the said opening is registrable through a range of movement of the plug, and a pin insertable through the said opening and slots for transmitting motion to the body.

13. An adjustable motion-transmitting device comprising, in combination, a body, means for mounting the body for movement in a given direction, a member mounted on the body in threaded engagement with the body so as to be adjustable with respect to the body in a direction different from the said given direction by rotation of the member, the member being formed with a transverse hole and the body being formed with a slot with which the said hole may be aligned through a range of adjustment of the member, and a reciprocable motion-transmitting means fitted in the said hole and passing through the said slot and hole in a direction normal to the direction of reciprocation of the said means, the said motion-transmitting means thus locking the member against rotation relative to the body.

14. An adjustable motion-transmitting device comprising, in combination, a body, means for mounting the body for rotation about an axis, a member mounted on the body in offset relation to the said axis, the member being in threaded engagement with the body so as to be adjustable with respect to the body by rotation of the member, the member being formed with a transverse hole and the body being formed with a slot with which the said hole may be aligned throughout a range of adjustment of the member, and a motion-transmitting means fitted in the said hole and passing through the said slot, the said motion-transmitting means thus locking the member against rotation relative to the body.

ARTHUR W. GAUBATZ.

REFERENCES CITED

The following references are of record in the file of this patent:

UNITED STATES PATENTS

| Number | Name | Date |
| --- | --- | --- |
| 533,549 | Mullenix | Feb. 5, 1895 |
| 679,408 | Abbott | July 30, 1901 |
| 1,619,810 | Cautley | Mar. 8, 1927 |
| 1,663,290 | Bendix | Mar. 20, 1928 |
| 1,844,415 | Wiljelm | Feb. 9, 1932 |
| 1,951,247 | Leighton | Mar. 13, 1934 |
| 2,260,684 | Root | Oct. 28, 1941 |
| 2,484,551 | Brouse | Oct. 11, 1949 |